United States Patent
Buhl et al.

(10) Patent No.: US 9,713,109 B2
(45) Date of Patent: Jul. 18, 2017

(54) METHOD FOR LOCATING A FREQUENCY DEVIATION IN A COMMUNICATION NETWORK, AND CORRESPONDING COMMUNICATION NETWORK

(71) Applicant: SIEMENS AKTIENGESELLSCHAFT, Müchen (DE)

(72) Inventors: Michael Bernhard Buhl, Grafing (DE); Dragan Obradovic, Ottobrunn (DE); Günter Steindl, Poppenricht (DE); Philipp Wolfrum, München (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/021,660

(22) PCT Filed: Aug. 20, 2014

(86) PCT No.: PCT/EP2014/067768
§ 371 (c)(1),
(2) Date: Mar. 11, 2016

(87) PCT Pub. No.: WO2015/036213
PCT Pub. Date: Mar. 19, 2015

(65) Prior Publication Data
US 2016/0249310 A1   Aug. 25, 2016

(30) Foreign Application Priority Data

Sep. 12, 2013  (DE) .................. 10 2013 218 328

(51) Int. Cl.
*H04W 56/00*  (2009.01)
*H04J 3/06*  (2006.01)
(Continued)

(52) U.S. Cl.
CPC ....... *H04W 56/0015* (2013.01); *H04J 3/0664* (2013.01); *H04J 3/0673* (2013.01); *H04J 3/14* (2013.01); *H04L 12/18* (2013.01)

(58) Field of Classification Search
CPC .......... H04L 47/10; H04L 47/30; H04L 47/12
See application file for complete search history.

(56) References Cited

U.S. PATENT DOCUMENTS

| | | | |
|---|---|---|---|
| 8,670,491 B2 | 3/2014 | Na et al. | |
| 2009/0086766 A1* | 4/2009 | Gotz | H04J 3/0673 370/503 |

(Continued)

FOREIGN PATENT DOCUMENTS

| | | |
|---|---|---|
| EP | 2034642 A1 | 3/2009 |
| EP | 2037602 A1 | 3/2009 |
| EP | 2299614 A2 | 3/2011 |

OTHER PUBLICATIONS

Andrea Bondavalli et al., "Assuring Resilient Time Synchronization," Reliable Distributed Systems, IEEE Symposium on, pp. 3-12, XP031366845: ISBN: 978-0-7695-3410-7, 2008.
(Continued)

*Primary Examiner* — Andrew Lai
*Assistant Examiner* — Zhiren Qin
(74) *Attorney, Agent, or Firm* — Lempia Summerfield Katz LLC

(57) ABSTRACT

Locating a frequency deviation in a communication network is provided. A node clock frequency is assigned to each internal clock of each network node. Messages are transmitted synchronizing the internal clocks. The synchronization messages are transmitted from one node to another in succession based on a reference clock frequency predefined by a reference clock. The synchronization messages include a reference clock count state of the reference clock. Synchronization deviations are calculated at predefined intervals
(Continued)

of time. If the synchronization deviation of the middle network node exceeds a threshold value, a change in the reference clock frequency is detected if the synchronization deviations of adjacent nodes. Otherwise, a change in the node clock frequency of the middle network node is detected.

16 Claims, 2 Drawing Sheets

(51) Int. Cl.
*H04J 3/14* (2006.01)
*H04L 12/18* (2006.01)

(56) References Cited

U.S. PATENT DOCUMENTS

2011/0064177 A1* 3/2011 Na .................. H04J 3/0664
375/356

2011/0161524 A1* 6/2011 Na .................. H04W 56/0015
709/248

OTHER PUBLICATIONS

Andrea Bondavalli et al., "Master Failure Detection Protocol in Internal Synchronization Environment," IEEE Transactions on Instrumentation and Measurement, IEEE Service Center, pp. 4-12, XP011475475, ISSN: 0018-9456, DOI:10.1109/TIM.2012.2209916, 2013.
IEEE 1588 V2, IEEE Standard for a Precision Clock Synchronization Protocol for Networked Measurement and Control Systems, Jul. 24, 2008.
PCT International Search Report and Written Opinion of the International Searching Authority dated Nov. 24, 2014 for corresponding PCT/EP2014/067768, with English Translation.
R. Lupas Scheiterer, C. Na, D. Obradovic und G. Steindl: "Synchronization Performance of the Precision Time Protocol in Industrial Automation Networks," ISPCS07 Special Issue of the IEEE Transactions on Instrumentation and Measurement, Jun. 2009, vol. 58, Issue 6, pp. 1849-1857.

* cited by examiner

METHOD FOR LOCATING A FREQUENCY DEVIATION IN A COMMUNICATION NETWORK, AND CORRESPONDING COMMUNICATION NETWORK

CROSS-REFERENCE TO RELATED APPLICATION

This application is the National Stage of International Application No. PCT/EP2014/067768, filed on Aug. 20, 2014, which claims priority to DE102013218328.3, filed Sep. 12, 2013, both of which are hereby incorporated by reference in their entirety.

FIELD

Communication networks are used in a multiplicity of technical fields to control operating sequences in a decentralized manner.

BACKGROUND

In industrial automation installations in particular, it is particularly important for the automatic operations to be accurately coordinated with one another. Via the individual network nodes communicating with one another in the communication network each having internal clocks and via synchronization messages being transmitted in order to synchronize all internal clocks, accurate coordination is achieved. The internal clock of a respective network node operates at a corresponding node clock frequency that may possibly be different for the individual network nodes. The clocks are synchronized on the basis of a predefined reference clock ("grandmaster clock") or its reference clock frequency, the synchronization messages being transmitted on the basis of the reference clock frequency. Synchronization messages are transmitted at fixed clock intervals according to the reference clock frequency. The individual synchronization messages transmitted in the communication network contain the clock count state of the reference clock. Each network node updates the clock count state for its own requirements by estimating the number of clock pulses of the reference clock between the emission of the synchronization message in the preceding network node and the reception of the synchronization message in the respective network node ("line delay"). In addition, each network node updates the clock count state for the next node by also estimating the number of clock pulses of the reference clock between its reception of the synchronization message and its emission of the synchronization message ("bridge delay"). The estimation may be carried out, inter alia, by estimating the clock ratio (also referred to as the "Rate Compensation Factor" RCF) between the reference clock frequency and the node clock frequency of the respective network node. The number of clock pulses of the node clock frequency can then be converted into the corresponding number of the reference clock frequency for any desired period of time using the estimated clock ratio. For example, the period of time between the emission of a synchronization message in the preceding network node and the emission of the synchronization message in the respective network node, measured in clock pulses of the node clock frequency, can therefore be converted into the clock pulses of the reference clock frequency. The resulting number of clock pulses is then added to the clock pulses of the received synchronization message, and an accordingly updated synchronization message is emitted by the corresponding network node again.

In the field of industrial automation technology, the IEC 61158 Type 10 standard (called PROFINET) is known from the prior art and involves an Ethernet which satisfies industrial specifications. The PROFINET standard operates according to the principle explained above, according to which the clock count states in the synchronization messages are updated in the network nodes. In order to synchronize the internal clocks of the network nodes, systems based on PROFINET use the Precision Transparent Clock Protocol (PTCP) according to IEC 61158 Type 10 PTCP that may be also referred to as a profile in the IEEE 1588 V2 standard.

The protocol updates the clock count states of the synchronization messages according to the principle explained above. According to the standard, synchronization messages are transmitted in succession from one network node to the next in a logical sequence or tree structure. The synchronization messages come from a reference node or master element that is the first element in the sequence or in the tree structure. The synchronization messages originally contain a time stamp of the counter of a reference clock in the reference node if a synchronization message has been transmitted. The network nodes in the sequence or tree structure, also called slaves, process and retransmit the information. A network node adds all estimated time delays between the emission of a synchronization message by the preceding network node and its own emission of the synchronization message to the synchronization message as contents.

A specific implementation is described in R. Lupas Scheiterer, C. Na, D. Obradovic and G. Steindl: "Synchronization Performance of the Precision Time Protocol in Industrial Automation Networks", ISPCS07 Special Issue of the IEEE Transactions on Instrumentation and Measurement, June 2009, Volume 58, Issue 6, pp. 1849-1857.

EP 2034642 A1 discloses a method in which the synchronization messages transmitted in the communication network contain the clock count state (or the estimated clock count state after the first slave) of the reference clock which operates at a reference clock frequency. The clock count state is estimated by each network node and is updated in the synchronization message. When estimating the clock count state, changes in the reference clock frequency are taken into account. The clock count state is accurately determined by approximating the temporal change in the clock ratio between the reference clock frequency and the node clock frequency by a function, as a result of which it is possible to predict the clock ratio when emitting a new synchronization message and a precise current clock count state can be determined on the basis of the predicted clock ratio.

EP 2299614 A2 discloses a method for time synchronization in a communication network that may be used to further improve the estimation of the clock count state of the reference clock. A controlled clock count state that represents an estimation of the reference clock count state and has a continuous profile, is determined for at least one network node with the aid of a controller. The previously determined, estimated reference clock count state is post-processed in each network node with the aid of a controller. Advantageously, the controller reduces noise across the estimated reference clock count state and uses the controlled clock count state to provide a continuous synchronized time (with a continuous profile) for each network node, as is required for many industrial requirements. Therefore, with predefined accuracy for the time synchronization, a greater number of network nodes can be included as a result of the use of the controller.

Therefore, the estimated reference clock count state is no longer used as an estimation of the reference clock count state for each network node's own requirements (but not for the forwarding to the next network node). Rather, the controlled clock count state is determined by tracking the estimated reference clock count state using the controller. The jumps in the estimated reference clock count state during recalculation after receiving a synchronization message may not be tolerated in many industrial applications. Therefore the jumps are converted into the continuous profile of the controlled clock count state. Disruptions in time-dependent processes are therefore reduced. In addition, the controlled clock count state on average has a smaller deviation from the reference clock count state than the estimated reference clock count state.

SUMMARY AND DESCRIPTION

The disclosed embodiments further reduce the risk of disruptions in time-dependent processes caused by a lack of synchronization of the network nodes. A method is provided for locating a frequency deviation in a communication network. The communication network includes a multiplicity of network nodes communicating with one another and each includes an internal clock, clocked at a node clock frequency assigned to the respective network node. Synchronization messages, used for the time synchronization of the internal clocks of the network nodes, are transmitted in the communication network. The synchronization messages are transmitted in succession from a preceding network node to a middle network node and, from the latter, to a next network node on the basis of a reference clock frequency predefined by a reference clock, the synchronization messages including the reference clock count state of the reference clock. The preceding network node, the middle network node and the next network node each calculate a synchronization deviation at predefined intervals of time. The middle network node carries out the following algorithm if the middle network node synchronization deviation determined last exceeds a threshold value. A change is detected in the reference clock frequency if the synchronization deviations that have been calculated by the preceding network node, the middle network node, and the next network node are similar to one another. Otherwise, a change is detected in the node clock frequency of the middle network node if the synchronization deviations calculated by the preceding network node and the next network node are similar to one another.

A communication network for locating a frequency deviation is also provided. The communication network includes a multiplicity of network nodes that communicate with one another and each include an internal clock that is clocked at a node clock frequency assigned to the respective network node. The communication network is further set up to transmit synchronization messages that are used for the time synchronization of the internal clocks of the network nodes. The communication network is also set up to transmit the synchronization messages in succession from a preceding network node to a middle network node and, from the latter, to a next network node on the basis of a reference clock frequency predefined by a reference clock. The synchronization messages including the reference clock count state of the reference clock. The preceding network node, the middle network node and the next network node are each set up to each calculate a synchronization deviation at predefined intervals of time. The middle network node is set up to carry out a subsequent algorithm if its synchronization deviation determined last exceeds a threshold value. The middle network detects a change in the reference clock frequency if the synchronization deviations that have been calculated by the preceding network node, the middle network node and the next network node are similar to one another. Otherwise, changes are detected in the node clock frequency of the middle network node if the synchronization deviations which have been calculated by the preceding network node and the next network node are similar to one another.

In addition, to the method just described and the apparatus, a computer-readable data storage medium is provided that stores a computer program which carries out the method via execution in a microprocessor.

A computer program is provided which is executed in a microprocessor and in the process carries out the method described above.

The method and the communication network allow a strong frequency deviation in the communication network to be immediately identified and located by examining the synchronization deviations in adjacent network nodes. In addition to a frequency deviation in the reference clock, a frequency deviation in the internal clock of every other network node can also be determined when the method is carried out by all network nodes.

A frequency deviation may be attributable to external influences. Prompt detection has multiple advantages:

1. A frequency deviation in an internal clock of a network node temporarily impairs the quality of estimation of the reference clock count state until the network node has completely adapted the clock ratio and the internal controller to the deviation. A measure of the quality of the time estimate in this network node consequently results from the detection of the frequency deviation.

2. A frequency deviation in the reference clock has considerably more serious effects. Since all network nodes endeavor to follow the reference clock, the nodes remain behind the reference clock in adaptation, with the result that the synchronization quality decreases in the entire communication network. Decrease in synchronization quality is aggravated by the fact that the adaptation is increasingly delayed on the basis of the distance from the reference clock. Not only the synchronization of the network nodes with the reference clock is impaired, but also the synchronization of the network nodes with one another is also impaired. The quick detection of a frequency deviation in the reference clock is therefore important.

3. The external disruption that causes the frequency deviation may be attributable to a system fault or an intrusion in the communication network. The precise localization of the network node affected assists the prompt determination and combating of the system fault or intrusion.

One embodiment provides a method in which a change in a clock ratio between the reference clock frequency and the node clock frequency of a network node is calculated as the synchronization deviation of a network node on the basis of synchronization messages received in the past.

Another embodiment provides a method wherein each network node is set up to determine an estimated reference clock count state representing an estimation of the reference clock count state of the reference clock. Deviation of the reference clock count state estimated by a network node from the reference clock count state in a received synchronization message is calculated as the synchronization deviation of a network node.

In this case, a fault that results from the difference between the estimated reference clock count state and the reference clock count state from the synchronization message received last is advantageously interchanged between the adjacent network nodes.

One embodiment results in a method where the detection result is transmitted to a central evaluation unit, making it possible to quickly centrally detect frequency deviations, allowing immediate reaction.

Another embodiment results in a method where the time synchronization is carried out according to the IEC 61158 Type 10 standard (called PROFINET) and/or the Precision Transparent Clock Protocol according to the IEC 61158 Type 10 PTCP standard. The reference node being used as the master and the network nodes being used as slaves according to the respective standards, and the communication network being a multicast network, such as an Ethernet.

The method and the communication network allow conventional protocols to be adapted, making it possible to evaluate synchronization deviations of adjacent network nodes.

One embodiment of a communication network includes a middle network node containing a network card (e.g., a network card with its own real-time clock and time stamp unit). The middle network node may consist of said network card.

The disclosed method may be used in an industrial automation installation in which distributed components of the installation communicate with one another in order to control production sequences (e.g., automobile production). For this purpose, the individual components communicate with one another in a wireless and/or wired manner via a communication network. The components are therefore network nodes of the communication network.

The scope of the present invention is defined solely by the appended claims and is not affected to any degree by the statements within this summary. The present embodiments may obviate one or more of the drawbacks or limitations in the related art.

DESCRIPTION OF THE FIGURES

Exemplary embodiments are described in detail below using the accompanying figures. In the figures, identical or functionally identical elements are provided with the same reference symbols unless indicated otherwise.

DETAILED DESCRIPTION

Figure 1:
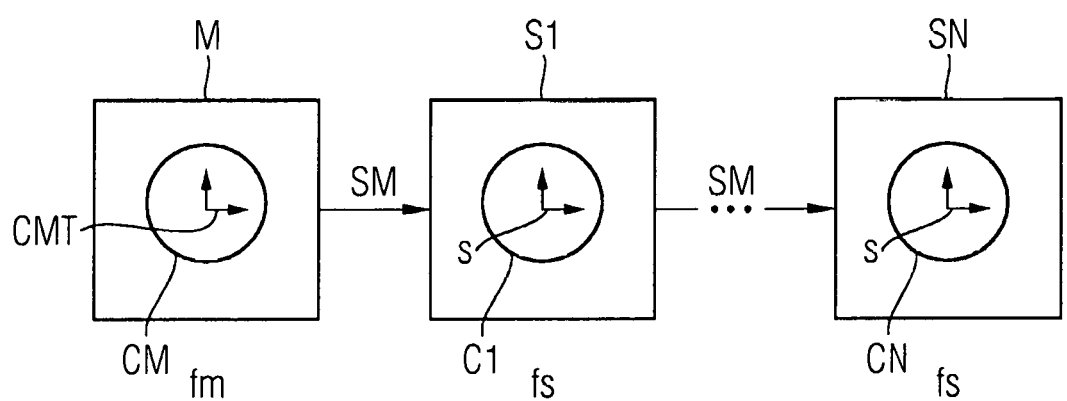
FIG. 1 depicts a schematic illustration of a plurality of network nodes in a communication network, between which synchronization messages are transmitted, of the prior art.

FIG. 1 illustrates network nodes S1 to SN (also called "slaves"), each network node S1 to SN having a corresponding internal clock C1, CN. Each clock operates at an individual node clock frequency fs (slave clock frequency) which may possibly be different for different network nodes S1 to SN. In addition, the communication network in FIG. 1 contains a reference node M (conventional technical term: master) that has a reference clock CM, clocked at a reference clock frequency fm. All internal clocks C1, ..., CN of the network nodes S1 to SN may be tuned to the reference clock. Synchronization messages SM are emitted by the reference node M at constant intervals including a predefined number of clock pulses of the reference clock CM. Each synchronization message SM may contain a reference clock count state CMT of the reference clock CM. That is to say, the clock pulses of the reference clock CM have already expired during operation of the method. In this case, this reference clock count state CMT is transmitted with each synchronization message SM.

The reference node M and the individual network nodes S1 to SN communicate with one another in a sequence. Synchronization messages are transmitted from the reference node M to the network node S1 and, from the latter, to the network node S2 and so on until the network node SN. In order to achieve exact time synchronization in the individual network nodes S1 to SN, the reference clock count state CMT in the synchronization messages SM is updated in the individual network nodes S1 to SN. Therefore, a time delay that is required between the emission of a synchronization message SM by the preceding network node S1 to SN (or the reference node M) and the emission of the synchronization message SM from the respective network node S1 to SN to the next network node S1 to SN is known in each network node S1 to SN. The time delay is composed of two periods of time LDi and BDi (i=1, ..., N, cf. also FIG. 2 with respect to this type of numbering of the network nodes), the periods of time being able to be different for each network node S1 to SN. In this case, LDi is the period of time needed to transmit the message from the preceding network node Si–1 to the respective network node Si (LD=Line Delay). BDi is a processing time needed in the network node Si to process a received synchronization message SM before emitting the synchronization message SM to the next network node (BD=Bridge Delay). This delay time is indicated in the respective network node S1 to SN in clock pulses according to the node clock frequency fs.

In order to update the reference clock count state CMT of a received synchronization message SM, the clock ratio between the reference clock frequency fm and the respective node clock frequency fs is estimated in the respective network node. This clock ratio is also referred to below as RCF (abbreviation for "Rate Compensation Factor") and is the quotient of fm and fs, for example. Multiplying the estimated clock ratio RCF by the time delay gives the number of counting clock pulses when emitting the previously received synchronization message SM again. This number is added to the reference clock count state CMT of the received synchronization message SM, and a synchronization message SM having the current reference clock count state CMT is emitted by the respective network node. In this case, the sequence of synchronizing the internal clocks C1 to CN is sufficiently well known to a person skilled in the art and is therefore not explained in detail.

The clock ratio RCF is locally calculated in each network node S1 to SN. A preliminary clock ratio RCFpre is calculated with CMT(k) as the reference clock count state CMT estimated by the respective network node S1 to SN at the time k, and s is the clock count state of the internal clock of the network node at the time k.

A final clock ratio RCF can be calculated from the preliminary clock ratio RCFpre by smoothing.

Thus, the clock ratio RCF (or the preliminary clock ratio RCFpre) must change with each frequency deviation in the reference clock frequency fm or the node clock frequency fs of the respective network node S1 to SN.

Figure 2:
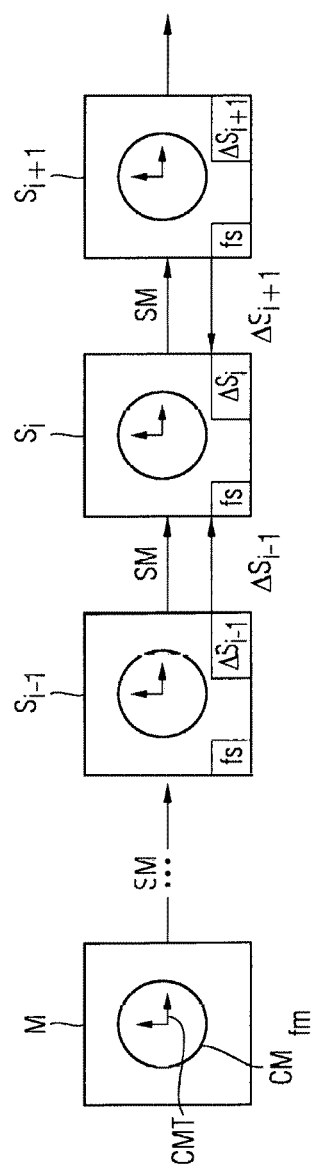
FIG. 2 depicts a schematic illustration of a plurality of network nodes in a communication network in accordance with one embodiment for locating a frequency deviation.

According to the exemplary embodiment of FIG. 2, in the event of a significant synchronization deviation ΔSi in a middle network node Si the change in the clock ratio RCF in the middle network node Si is calculated. For example, the most recent change in the clock ratio RCF is interchanged with adjacent network nodes Si−1 and Si+1 as the synchronization deviation. The adjacent nodes Si−1 and Si+1 transmit a change in their own clock ratio RCF calculated last to the middle network node Si as the synchronization deviation ΔSi−1, ΔSi+1. In this case, the synchronization deviations ΔSi−1, ΔSi, ΔSi+1 are not necessarily used to better synchronize the network nodes Si−1, Si and Si+1. Instead, the synchronization deviations determine whether the synchronization deviation ΔSi in the middle network node Si can be attributed to a frequency deviation in the reference clock frequency fm in the reference node M or in the node clock frequency fs in the network node Si. If the clock ratio RCF in the network nodes Si−1, Si and Si+1 has changed by the same amount. That is, if the synchronization deviations ΔSi−1, ΔSi, ΔSi+1 are the same as or similar to one another, the deviation may be caused by: a) an identical change in the node clock frequency fs in the network nodes Si−1, Si and Si+1, or b) a change in the reference clock frequency fm.

Whereas the probability of observing identical changes in the clock ratio RCF or identical synchronization deviations ΔSi−1, ΔSi, ΔSi+1 in the network nodes Si−1, Si and Si+1 is 1 in both cases, the a priori probability of a frequency change only in the reference clock CM is considerably higher than an identical frequency change in the network nodes Si−1, Si and Si+1. Using Bayes' theorem, the determined significant change in the clock ratio RCF in the network node Si is most likely to have been caused by a change in the reference clock frequency fm.

In contrast, if the network node Si determines a significant synchronization deviation or a significant change in its clock ratio RCF with respect to its adjacent network nodes Si−1 and Si+1, and the synchronization deviation ΔSi−1 of the adjacent network node Si−1 is similar to the synchronization deviation ΔSi+1 of the adjacent network node Si+1, a change in the node clock frequency fs in the network node i is the most likely cause.

The diagnostic algorithm according to the present exemplary embodiment is executed at suitable intervals of time and operates as follows:

---

IF ΔSi > threshold value
    THEN IF ΔSi, ΔSi−1, ΔSi+1 are similar to one another,
        THEN detect a change in the reference clock frequency fm,
        ELSE
            IF ΔSi−1, ΔSi+1 are similar to one another,
                THEN detect a change in the node clock frequency fs in the network node i
            ELSE
                no detection possible.

---

The quantitative determination of the threshold value or the similarities, that is to say the parameters of the algorithm, is carried out according to the respective requirements and system properties.

If a frequency change is detected, the detected change is communicated, according to one variant of the exemplary embodiment, to a central evaluation unit which combines and evaluates the relevant signals from all network nodes.

Instead of the deviations in the clock ratio RCF, the algorithm can also evaluate, as synchronization deviations ΔSi−1, ΔSi, ΔSi+1, a deviation in a reference clock count state RMT estimated by the respective network node Si−1, Si and Si+1 with respect to the reference clock count state CMT in a received synchronization message SM.

The algorithm is executed, for example, in a microprocessor that may be arranged, on a network card such as a network card with its own real-time clock and time stamp unit. The algorithm can also be implemented via special hardware or a circuit. An embodiment of the real-time clock and the time stamp unit in hardware is advantageous on account of the high requirements imposed on temporal accuracy. As an alternative to the real-time clock on the network card, a system clock of the network node may be used.

In one exemplary embodiment, the time synchronization is carried out according to the IEC 61158 Type 10 standard (called PROFINET) and alternatively or additionally according to the Precision Transparent Clock Protocol (PTCP) according to IEC 61158 Type 10 PTCP that may be also referred to as a profile in the IEEE 1588 V2 standard. In this case, the reference node M is used as the master, while the network nodes S1-SN are used as slaves according to the respective standards. A multicast network (e.g., an Ethernet network) is suitable as the communication network.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for locating a frequency deviation in a communication network, the method comprising:
    clocking an internal clock of each of a plurality of communicating network nodes of the communication network at a node clock frequency assigned to each respective communication network node;
    transmitting, in the communications network, a plurality of synchronization messages for synchronizing the internal clocks of the plurality of network nodes, wherein the plurality of synchronization messages are transmitted in succession from a preceding network node to a middle network node and from the middle network node to a next network node based on a reference clock frequency predefined by a reference clock, wherein the plurality of synchronization messages include a reference clock count state of the reference clock;
    calculating, by each of the preceding network node, the middle network node, and the next network node, a synchronization deviation at predefined intervals of time;
    determining whether the synchronization deviation of the middle network node exceeds a threshold value; and
    detecting a change in the reference clock frequency when the synchronization deviations calculated by the preceding network node, the middle network node, and the next network node are similar to one another and the synchronization deviation of the middle network node exceeds the threshold value; and otherwise detecting a change in the node clock frequency of the middle network node when the synchronization deviations calculated by the preceding network node and the next network node are similar to one another and the synchronization deviation of the middle network exceeds the threshold value.

2. The method of claim 1, wherein calculating the synchronization deviation of at least one network node comprises:
calculating a change in a clock ratio between the reference clock frequency and the node clock frequency of the at least one network node based on previously received synchronization messages.

3. The method of claim 2, further comprising:
transmitting the detected change to a central evaluation unit.

4. The method of claim 2,
wherein the time synchronization is based on the IEC 61158 Type 10 standard (PROFINET), the Precision Transparent Clock Protocol (PTCP) according to the IEC 61158 Type 10 PTCP standard, or PROFINET and PTCP,
wherein the reference node is a master and the remaining network nodes are slaves based on respective standards, and
wherein the communication network is a multicast network.

5. The method of claim 1, further comprising:
determining, by each network node, an estimated reference clock count state representing an estimation of the reference clock count state of the reference clock; and
estimating, by at least one network node, a deviation of the reference clock count state based on the reference clock count state in a received synchronization message based on the synchronization deviation of a network node.

6. The method of claim 5, further comprising:
transmitting the detected change to a central evaluation unit.

7. The method of claim 5,
wherein the time synchronization is based on the IEC 61158 Type 10 standard (PROFINET), the Precision Transparent Clock Protocol (PTCP) according to the IEC 61158 Type 10 PTCP standard, or PROFINET and PTCP,
wherein the reference node is a master and the remaining network nodes are slaves based on respective standards, and
wherein the communication network is a multicast network.

8. The method of claim 1, further comprising transmitting the detected change to a central evaluation unit.

9. The method of claim 8,
wherein the time synchronization is based on the IEC 61158 Type 10 standard (PROFINET), the Precision Transparent Clock Protocol (PTCP) according to the IEC 61158 Type 10 PTCP standard, or PROFINET and PTCP,
wherein the reference node is a master and the remaining network nodes are slaves based on respective standards, and
wherein the communication network is a multicast network.

10. The method of claim 1,
wherein the time synchronization is based on the IEC 61158 Type 10 standard (PROFINET), the Precision Transparent Clock Protocol (PTCP) according to the IEC 61158 Type 10 PTCP standard, or PROFINET and PTCP,
wherein the reference node is a master and the remaining network nodes are slaves based on respective standards, and
wherein the communication network is a multicast network.

11. A communication network comprising:
a plurality of network nodes in communication with one another, each network node comprising:
an internal clock, clocked at a node clock frequency assigned to each respective network node,
wherein each network node transmits synchronization messages used for the time synchronization of internal clocks of the plurality of network nodes,
wherein the synchronization messages are transmitted in succession from a preceding network node to a middle network node, from the middle network node to a next network node based on a reference clock frequency predefined by a reference clock, the synchronization messages comprising a reference clock count state of the reference clock,
wherein the preceding network node, the middle network node, and the next network node are each configured to calculate a synchronization deviation at predefined intervals of time,
wherein a previous synchronization deviation value of the middle network node is compared to a threshold value;
wherein the middle network node is configured to detect a change in the reference clock frequency when the synchronization deviations calculated by the preceding network node, the middle network node, and the next network node are similar to one another, and the synchronization deviation value of the middle network node exceeds the threshold value, and otherwise
wherein the middle network node is configured to detect a change in the node clock frequency of the middle network node when the synchronization deviations calculated by the preceding network node and the next network node are similar to one another, and the synchronization deviation value of the middle network node exceeds the threshold value.

12. The communication network as claimed in claim 11, wherein the middle network node consists of:
a network card; or
wherein the middle network node comprises:
the network card,
a real-time clock, and
a time stamp unite.

13. A non-transitory computer-readable data storage medium storing instructions, that when executed by a microprocessor cause the microprocessor to perform the instructions, the instructions comprising:
clocking an internal clock of each of a plurality of communicating network nodes of the communication network at a node clock frequency assigned to each respective communication network node;
transmitting a plurality of synchronization messages synchronizing the internal clocks of the plurality of network nodes, wherein the plurality of synchronization messages are transmitted in succession from a preceding network node to a middle network node and from the middle network node to a next network node based on a reference clock frequency predefined by a reference clock, wherein the plurality of synchronization messages include a reference clock count state of the reference clock;

calculating, by each of the preceding network node, the middle network node, and the next network node, a synchronization deviation at predefined intervals of time;

determining whether the synchronization deviation of the middle network node exceeds a threshold value;

detecting a change in the reference clock frequency when the synchronization deviations calculated by the preceding network node, the middle network node, and the next network node are similar to one another and the synchronization deviation of the middle network node exceeds the threshold value; and otherwise detecting a change in the node clock frequency of the middle network node when the synchronization deviations calculated by the preceding network node and the next network node are similar to one another and the synchronization deviation of the middle network exceeds the threshold value.

14. The non-transitory computer-readable data storage medium of claim 13, wherein the synchronization deviation of at least one network node includes
calculating a change in a clock ratio between the reference clock frequency and the node clock frequency of the at least one network node based on previously received synchronization messages.

15. The non-transitory computer-readable data storage medium of claim 13, wherein the instructions further comprise:
determining, by each network node, an estimated reference clock count state representing an estimation of the reference clock count state of the reference clock; and
estimating, by at least one network node, a deviation of the reference clock count state based on the reference clock count state in a received synchronization message based on the synchronization deviation of a network node.

16. The non-transitory computer-readable data storage medium of claim 13,
wherein the instructions further comprise transmitting the detected change to a central evaluation unit.

\* \* \* \* \*